（12) United States Patent
Leung et al.

(10) Patent No.: US 8,971,473 B2
(45) Date of Patent: Mar. 3, 2015

(54) PLASMA DRIVEN NEUTRON/GAMMA GENERATOR

(75) Inventors: Ka-Ngo Leung, Hercules, CA (US); Arlyn Antolak, Patterson, CA (US)

(73) Assignees: Sandia Corporation, Albuquerque, NM (US); Lawrence Berkeley National Laboratory, Berkeley, CA (US)

( * ) Notice: Subject to any disclaimer, the term of this patent is extended or adjusted under 35 U.S.C. 154(b) by 756 days.

(21) Appl. No.: 12/992,188

(22) PCT Filed: Jun. 9, 2009

(86) PCT No.: PCT/US2009/046759
§ 371 (c)(1),
(2), (4) Date: Dec. 13, 2010

(87) PCT Pub. No.: WO2010/036422
PCT Pub. Date: Apr. 1, 2010

(65) Prior Publication Data
US 2011/0096885 A1 Apr. 28, 2011

Related U.S. Application Data

(60) Provisional application No. 61/060,404, filed on Jun. 10, 2008.

(51) Int. Cl.
*G21G 4/02* (2006.01)
*H05H 3/06* (2006.01)

(52) U.S. Cl.
CPC ........................... *H05H 3/06* (2013.01)
USPC ........................................................ 376/108

(58) Field of Classification Search
USPC ................................. 376/108, 114
See application file for complete search history.

(56) References Cited

U.S. PATENT DOCUMENTS 4,425,529 A * 1/1984 Leboutet ...................... 315/5.41
5,750,987 A 5/1998 Ichimura et al.
(Continued)

FOREIGN PATENT DOCUMENTS

JP 2005-005197 A 6/2005
KR 10-2002-004934 3/2002
KR 10-2007-0119072 A 1/2010

OTHER PUBLICATIONS

Ueda et al.. "Secondary electron suppression in nitrogen plasma ion implantation using a low DC magnetic field", Surf. & Coat. Tech., 201,6597-6600 (2007).
(Continued)

*Primary Examiner* — Jack W Keith
*Assistant Examiner* — Sean P Burke
(74) *Attorney, Agent, or Firm* — Medley, Behrens & Lewis, LLC (57) ABSTRACT

An apparatus for the generation of neutron/gamma rays is described including a chamber which defines an ion source, said apparatus including an RF antenna positioned outside of or within the chamber. Positioned within the chamber is a target material. One or more sets of confining magnets are also provided to create a cross B magnetic field directly above the target. To generate neutrons/gamma rays, the appropriate source gas is first introduced into the chamber, the RF antenna energized and a plasma formed. A series of high voltage pulses are then applied to the target. A plasma sheath, which serves as an accelerating gap, is formed upon application of the high voltage pulse to the target. Depending upon the selected combination of source gas and target material, either neutrons or gamma rays are generated, which may be used for cargo inspection, and the like.

20 Claims, 5 Drawing Sheets

(56) References Cited

U.S. PATENT DOCUMENTS

| | | | |
|---|---|---|---|
| 6,141,395 A * | 10/2000 | Nishimura et al. | 376/114 |
| 7,342,988 B2 * | 3/2008 | Leung et al. | 376/108 |
| 7,362,842 B2 * | 4/2008 | Leung | 376/108 |

OTHER PUBLICATIONS

Wkipedia, "Plasma-immersion on implantation", avaliable at http://en.wikipedia.orgiwiki/Plasma-immersion_ion_implantation.

* cited by examiner

PLASMA DRIVEN NEUTRON/GAMMA GENERATOR

CROSS REFERENCE TO RELATED APPLICATIONS

This application claims priority to PCT Application PCT/US2009/046759, filed Jun. 9, 2009, entitled Plasma Driven Neutron/Gamma Generator, which PCT application in turn claims priority to U.S. Provisional Patent Application Ser. No. 61/060,404, filed Jun. 10, 2008, and entitled Plasma Driven Neutron/Gamma Generator, the contents of which applications are incorporated herein by reference in their entirety.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

BACKGROUND OF THE INVENTION

1. Field of the Invention

This invention relates generally to methods and apparatus for the generation of neutrons and gamma rays for interrogation of objects, and more specifically to plasma driven methods and apparatus for the generation of such neutron/gamma rays.

2. Description of the Prior Art

Many non-intrusive active interrogation techniques utilize neutrons or gamma rays to detect special nuclear material (SNM) concealed in cargo. Other applications include oil-well logging, medical imaging, mechanical inspection, etc. For active interrogation systems with neutron sources, neutron induced gamma rays are detected and, sometimes, transmitted neutrons are measured as well. Neutron induced gamma spectra of different materials are used as a type of fingerprint. Fast neutrons are often used to obtain a deep penetration into large inspected objects and, thus, generate a very high background from surrounding materials. While this high background restricts the maximum screening speed of many neutron-based systems, neutrons also tend to activate the surrounding materials after an extensive long period of operation.

Gamma-based systems, on the other hand, detect neutrons produced from photonuclear reactions or transmitted gamma rays. Because the neutron production cross sections of many special nuclear materials due to photofission are much higher than that of most common materials, the neutron background in gamma-based interrogation techniques is fairly low. Furthermore, the induced radioactivity of surrounding materials due to gamma rays of less than 16 MeV is rather small due to the high threshold energy of photonuclear reactions.

The generators used for these sources typically consist of three main components, (1) the ion source, (2) the extraction and acceleration column and (3) the target. The ion source is where the ions are generated. For long life and efficient operation, RF induction discharge is normally employed. Single or multiple ion beamlets are then extracted from the source plasma and accelerated to the desired energy by means of an electrostatic acceleration column. Depending upon the final beam energy and beam shape, the acceleration column can have various configurations and voltage distributions. These ion beamlets impinge on a target which is in the form either of a Ti film for neutron production or a boron $B^{11}$ compound such as $LaB_6$ for 11.7 MeV gamma production.

Depending on the application, to accelerate the protons generated at the ion source, the number of electrodes in an electrostatic acceleration column can vary from one to five or more. Construction and mechanical alignment of these beam electrodes is not a simple task. Normally, ion optics simulation is required to guide the mechanical design. For voltage hold-off reasons, the length of the column can be relatively long. External pumping is needed to maintain a low pressure inside the column so as to minimize beam loss and secondary electron generation. Electrons formed in the acceleration column and on the target surface will be accelerated back towards the ion source. These backstreaming electrons can cause damage on the electrodes and the ion source chamber. They can also produce substantial amount of x-rays. In addition, they increase the drain current of the high voltage power supply. For this reason various protection schemes are required in the design of the generator to keep these secondary electrons from accelerating back to the ion source chamber.

Most existing gamma-based interrogation systems use electron linacs or microtrons to generate the gamma beams; thus, the deployment of these systems is limited by their size, complexity and high cost of ownership. In commonly owned U.S. Pat. No. 6,870,894, another approach is described covering a compact coaxial system for the generation of neutrons and gamma rays. While such a co-axial apparatus is very useful for the generation of such energy beams, there still remains the need for even lower-cost, more compact, portable gamma and neutron sources for use in active interrogation systems to detect SNM.

SUMMARY OF THE INTENTION

By way of this invention a modified plasma ion immersion type apparatus that can be used for the generation of neutrons and gamma rays is described, along with a method for using such apparatus. Herein, the ion source plasma is generated by RF induction discharge which can provide a high percentage of the desired atomic ion species ($H^+$, $D^+$ or $T^+$), along with high current density. The design of the chamber is basically the same, regardless of whether one desires to create a neutron beam or a gamma ray beam. Likewise, the RF antenna used to impart energy to the system for generating the plasma can be placed either inside the ion source chamber or on the external surface of the chamber wall. Finally, and unique to the system is the suppression of electrons at the target by use of appropriately placed permanent magnets to confine the electrons produced as a result of collisions of ions from the plasma with the target materials at the surface of the target. By so confining these secondary electrons, the magnets bending the electrons back to the target, the creation of x-rays is prevented and less power consumed to generate a beam of a given gamma or neutron density.

The neutron or gamma beams, as desired are created when ions from the plasma hit the selected target. By appropriate selection of source gases and target materials, the selection criteria well known in the art, one can generate either neutrons or gammas. For example, where once wishes to generate gamma rays, the source gas can be hydrogen, which yields the $H^+$ proton during plasma formation, which in combination with a target containing boron, Li, or F, when struck by the $H^+$ proton will produce gamma rays. In the case where one prefers to generate neutrons, deuterium ($^2H$) or tritium ($^3H$) can be used as the source gas, employed with a deuterium or tritium containing target.

By the method of this invention, the plasma in the plasma chamber is formed before a voltage is applied to the target substrate. Thereafter, a negative voltage of 80 to 180 kV is applied to the target such that the ions from the plasma reach the target with theses energies.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Plasma Immersion-Type Generator

To produce high yields of neutrons or gammas from nuclear reactions, positive $D^+$ or $H^+$ ions with energies >100 keV are needed. With conventional technology, the $H^+/D^+$ ions are first extracted from an ion source and then accelerated to a target by an electrostatic or RF accelerator. On the other hand, according to this invention, the $H^+/D^+$ ions are directly accelerated to a negatively biased target electrode located inside a plasma generator. Specifically, when a dense ion plasma is produced by RF induction discharge and a negative voltage is applied to the target electrode, an ion sheath forms in front of the target surface, this sheath acting as the acceleration gap (See FIG. 2, item 11). At the voltages and temperatures that a plasma immersion neutron/gamma source would be operated, the sheath thickness will be small relative to the size of the source chamber (in one embodiment approximately 1 cm). Because no acceleration column is needed, the source is much more compact in size. In addition, other advantages of this approach include:

- higher particle production efficiency (100% transparency)
- higher gas pressure operation (~10 milli Torr)
- amenable to sealed tube operation
- does not require a switching electrode for pulsed mode operation
- can be configured as axial, coaxial, or point source It should be noted that collisional sheath effects in the plasma will become important at higher pressures and will affect the ion energy and angular distribution at the impact electrode (i.e., the target). Computational modeling of the plasma source (ion density $\sim 10^{11}$-$10^{12}$ cm$^{-3}$, $T_e \sim 5$ eV), pulsed sheath formation, and the energy/angular distribution functions for particle impact at the biased high voltage electrode surface (100-165 kV, 20 μsec pulse at 500 Hz) can be performed to optimize the source performance. In particular, the modeling can be performed using (1) a one-dimensional plasma particle code, and (2) a two-dimensional kinetic particle-in-cell code to help to predict what will be the energy of the ions when they arrive at the target surface.

Figure 1:
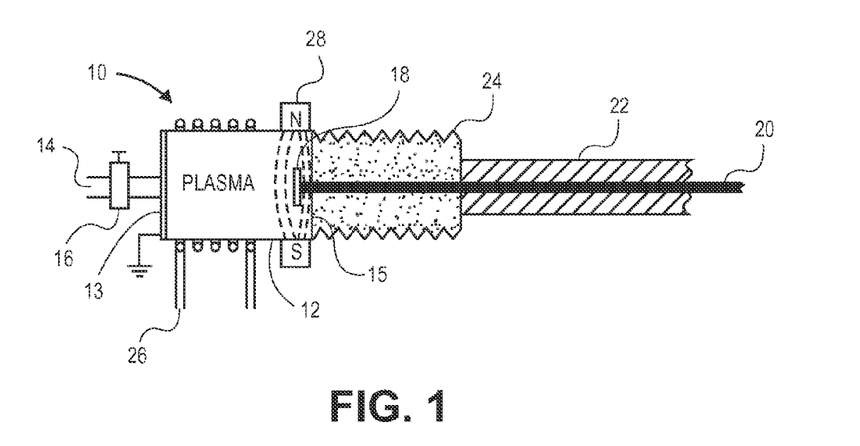
FIG. 1 is a cross section schematic diagram of a miniature neutron/gamma generator according to an embodiment of the invention.

With reference now to FIG. 1, in a first embodiment for a miniature neutron/gamma source 10, a chamber 12 is shown in cross section, the chamber at a first end capped by a flange 13 made out of a metal, such as copper. Gas introduction into the chamber 12 from source 14 is controlled by valve 16. The gas may be hydrogen, deuterium or tritium. At the other end 15 of the chamber, a target 18 is positioned. The target may be formed from any number of known materials, depending on the desired chamber output and associated source gas. The target itself is directly connected to high voltage line 20, encased in cable shielding 22, which is further encased in dielectric shielding material 24 adjacent the second end of the plasma chamber. The high voltage line 20 is itself connected to a pulsed power supply (item 21 in FIG. 3). Exemplary of a miniature source of the type depicted in FIG. 1 is a chamber having a diameter of approximately 1 to 1.5 cm and a length of about 5 cm.

The chamber is surrounded by RF antenna 26 which is wrapped around chamber 12, which is grounded. The RF antenna can be formed of a solid copper wire around the outer cylindrical wall of the chamber, which may be constructed of a quartz or ceramic material. Finally, permanent magnet pairs are used to produce a magnetic $-B$ field "layer" across the target surface. In FIG. 1, such permanent magnets are positioned in proximity to the second end 15 of the chamber 12 proximate target 18. This cross B field is strong enough to reflect the secondary electrons back to the target surface, effectively capturing and suppressing back streaming secondary electrons generated as the protons from the plasma strike the target.

Depending on the neutron energy required, the source chamber can be filled with pure deuterium, a mixture of deuterium and tritium or pure tritium gas for plasma formation. Once the plasma is formed, a plasma potential will be established which is about 10V positive relative to the source chamber wall. With a high negative voltage (~100 kV) suddenly applied to the target electrode, an ion sheath will form in front of the target surface.

The thickness of the steady state Child law sheath is given by $$s = 3\sqrt{2}\lambda_d (2V/T_e)^{3/4}$$

Where $T_e$ is the electron temperature, V is the applied voltage on the target and $\lambda_d$ is the electron Debye length.

The Child law current density J for a voltage V across a sheath of thickness s is given by $$J = (4/9)\in (2e/m)^{1/2} (V)^{3/2} (s)^{-2}$$

where $\in$ is the free space permittivity, e is the electronic charge and M is the ion mass.

This current density should be equal to the ion current density at the sheath boundary which is given by $$J_i = 0/6 n e (T_e/M)^{1/2}$$

where n is the plasma density at the center of the source chamber, e is the electronic charge and M is the mass of the ion.

This negative bias voltage will push the plasma electron away but accelerate positive ions towards the target electrode. Thus, at this point in time the sheath now acts as the acceleration gap. The deuterium or tritium ions will have acquired a 100 KeV potential energy when they arrive at the target surface and neutrons will be formed by the fusion reactions. In addition, secondary electrons will also be generated by the incoming ions on the target surface. Without the presence of a cross B-field, these secondary emission electrons would otherwise be accelerated away from the target by the same electric field that accelerated the positive ions towards the target.

When the plasma source is operated with sufficient power to produce a current density of 250 mA/cm$^2$, the sheath thickness is estimated to be about 15 mm. Thus, the thickness of the B-field on the target surface should be larger than this value. The magnitude of the B-field will depend on the bias voltage on the target. If V=100 KV, the required B-field is about 1 kG. For the p$^+$>born gamma production, a target bias voltage of >165 KV is needed. In this case, a thicker layer of B-field with magnitude greater than 1 kG will be required to suppress the secondary emission electrons.

Method of Operation

In operation the plasma is first switched on by introducing the source gas into the chamber and then activating the RF antenna. The RF power can range from hundreds to thousands of kilowatts. With the RF switched on, the plasma first forms and then high voltage is applied to the target. With the high voltage on, the ion sheath which acts as the acceleration gap forms in front to the target surface. The movement of the energetic ions across this "acceleration gap" causes the nuclear reactions to occur in the target, leading to the production of neutrons and/or mono energetic gammas. Plasma formation will not occur if the high voltage is switched on first. Thus the sequence for switching the plasma on before the high voltage is critical to the operation of this source.

The target, by being connected to a high voltage is charged at a lower potential that the plasma, thus acting as a negative electrode. As previously noted, secondary emission electrons, formed on the negative target electrode are accelerated back towards the plasma. These electrons can constitute a large fraction of the high-voltage power supply drain current, and they also produce unwanted x-rays. Suppression of these electrons in the plasma immersion source is achieved by applying a cross-magnetic-field generated by a pair of permanent magnets 28. Typically hundreds of gauss are needed for turning the secondary electrons back to the target surface.

The high voltage source is pulsed using a commercially available RF power supply, the pulsing controlled by adjusting the control of the power supply.

Figure 2:
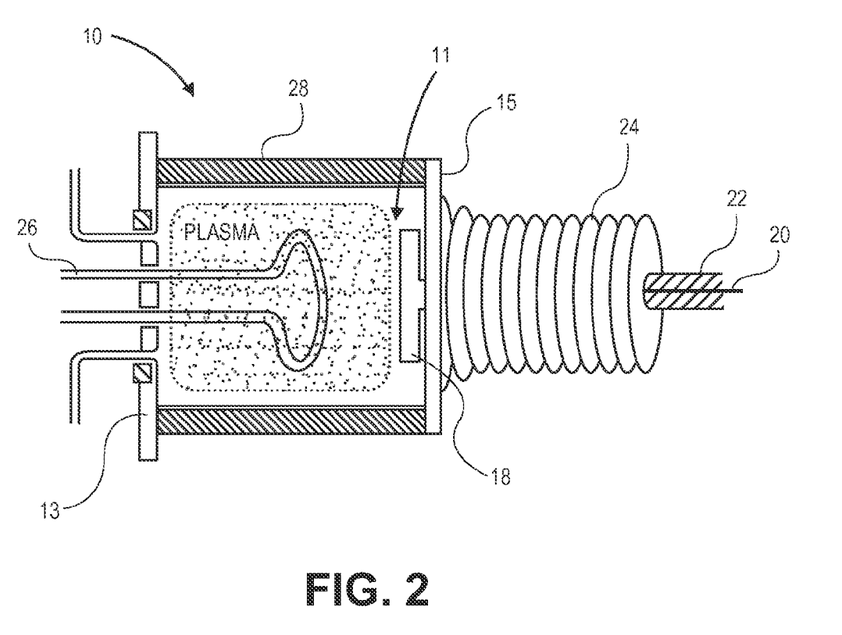
FIG. 2 is a cross section schematic diagram for a miniature neutron/gamma generator similar to that of FIG. 1, wherein the RF antenna is positioned within the generator chamber.

In an alternative embodiment of the invention, the RF antenna 26 can be positioned within the chamber 12 as shown in FIG. 2. In this embodiment with the RF antenna 26 positioned as shown, the chamber is surrounded by permanent magnet 28. Target 18 is positioned at the other end 15 of the chamber, acceleration gap 11 defined by the space between the edge of the plasma sheath and the target.

Where higher yields are desired, larger target sizes can be used. Thus target dimensions can vary in size. As an example, target size may vary from 1 cm all the way up to multiple centimeters. For such larger targets, chambers of up to 15 cm may be used; the plasma immersion-type source operated with a 2 Kw, 13.5 MHz RF power supply and a 50 mA, 165 KV HV power supply.

Figure 3:
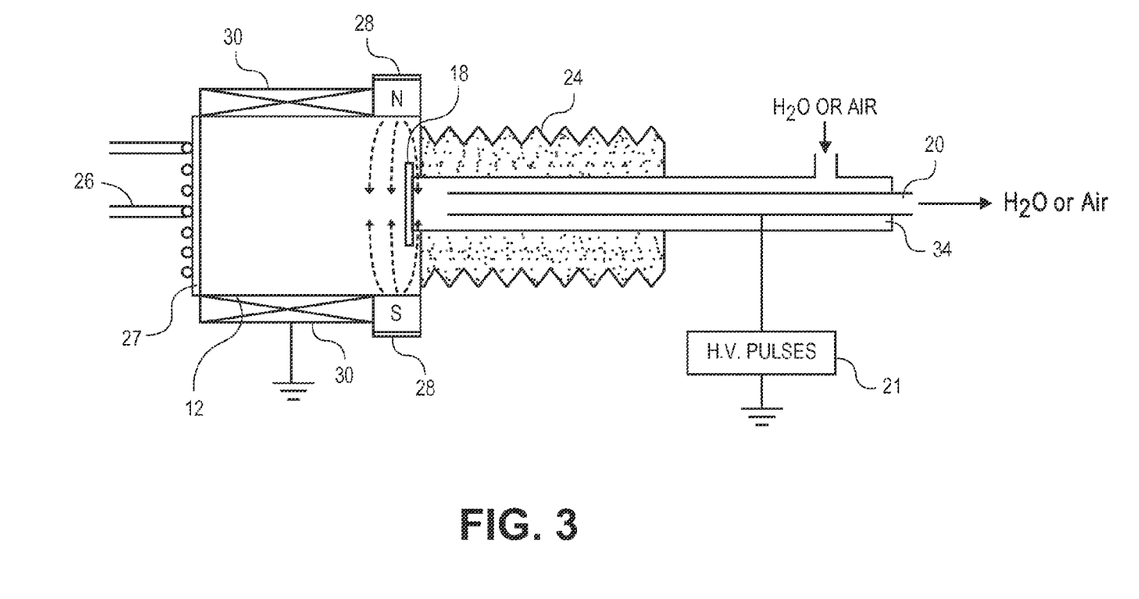
FIG. 3 is a cross section schematic diagram of a medium sized neutron/gamma generator according to another embodiment of the invention.

FIG. 3 is exemplary of a medium sized neutron/gamma generator according to an aspect of the invention. In this embodiment, an RF antenna 26 is shown outside the chamber 12, antenna 26 a flat spiral coil positioned atop a quartz/ceramic window 27. Permanent magnets 30 around the outside of the chamber are used to confine the plasma within the chamber and paired permanent magnets 28 are used as suppression magnets to confine generated secondary electrons. With this larger chamber, cooling is provided to the system through line 34 using water or air, which cooling system surrounds high voltage line 20

Figure 4A:
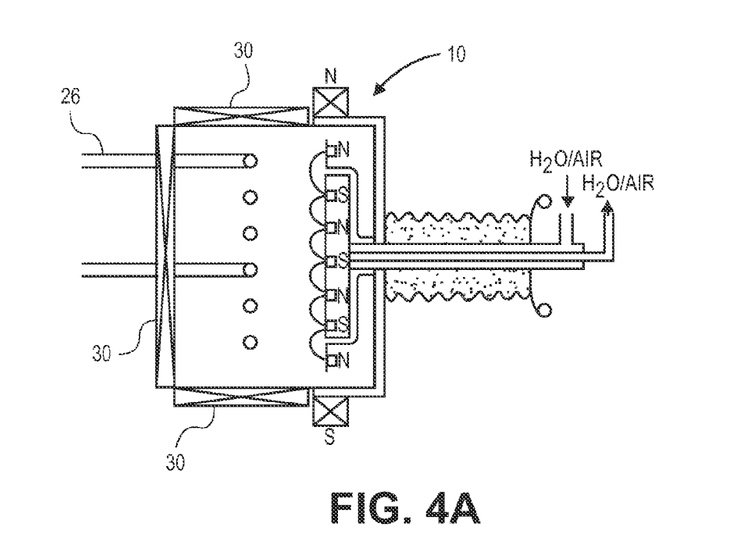
FIGS. 4A and 4B are cross section schematic diagrams of a large diameter neutron/gamma generator according to yet another embodiment of the invention, illustrating two different arrangement of confining magnets according to the invention.
Figure 4B:
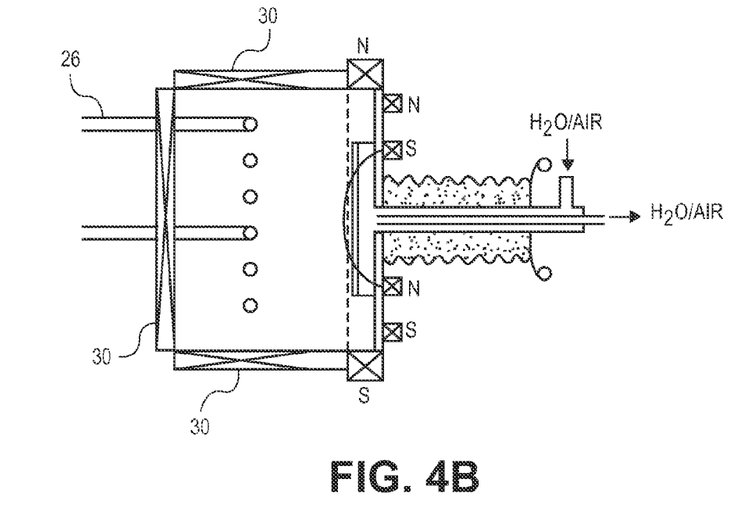

FIGS. 4A and 4B show similar arrangements for even larger diameter chambers, such as might be used for targets up to 30 cm diameter in size, illustrating different approaches to the arrangement of permanent magnets to create the suppressing cross B magnetic field. It has also been found to be more convenient with the larger chamber to place the antenna inside the source chamber. In this case, the antenna may be quartz tubing which encloses a conducting metal tubing or metallic wires inside.

Collision effects in the plasma will affect the ion energy and angular distribution at the target electrode and become important at higher gas pressures. To address these effects, the plasma source can be computationally modeled, along with pulsed sheath formation, and the distribution functions for particle impact, the results used to optimize the source design.

For neutron production, a titanium target is normally employed. A boron target (e.g. LaB$_6$, B$_4$C, impregnated boron on metal matrix, etc. can be used for gamma production. The target is connected by a high voltage feed through to a pulsed power supply.

Figure 5:
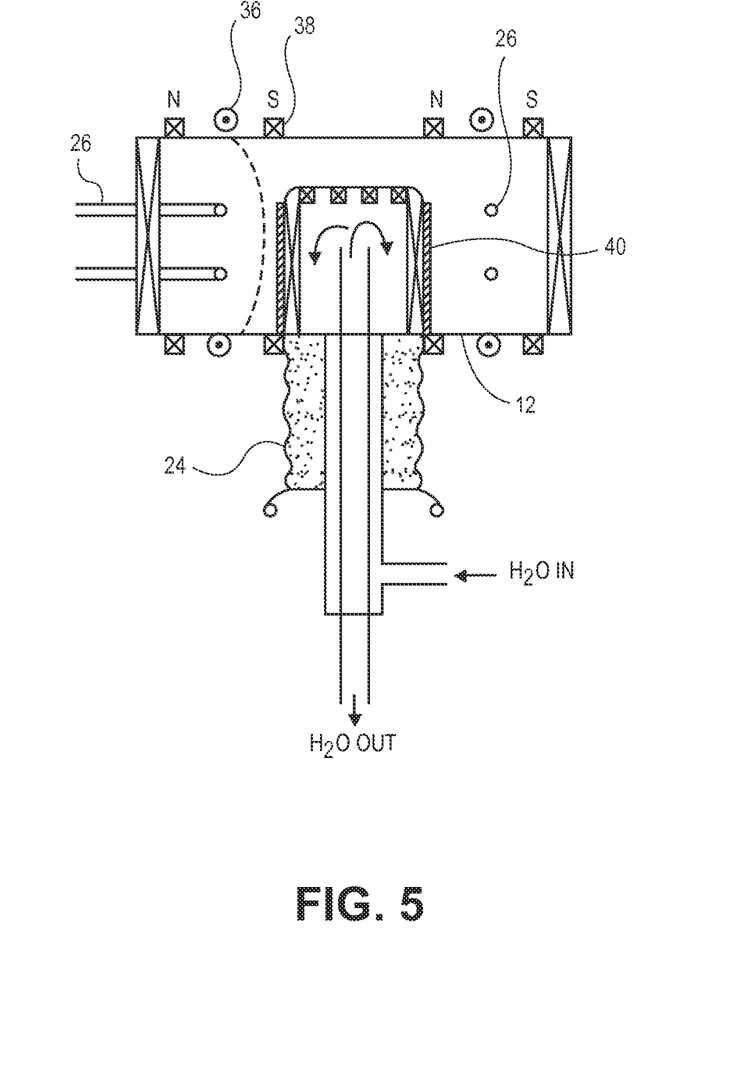
FIG. 5 is a cross section schematic of a coaxial neutron/gamma generator, illustrating the adaptation of the plasma based approach of this invention to this design.

The application of this approach of neutron/gamma generation to existing co-axial designs is illustrated in FIG. 5. The coaxial configuration is one that can provide large numbers of ion beamlets with a minimum volume, thus making the system very compact. In this embodiment, Helmholtz coils 36 surrounds the plasma chamber as do paired permanent magnets 38. An annular target 40 is positioned to the center of the chamber, and water cooled as illustrated.

As an advantage of using plasma chambers according to the present invention to form neutrons and gammas, whereby the acceleration gap is provided by the distance between the plasma sheath and the target, no special pressures are required for operation, as in the case of linear accelerators which must be operated at very low pressures. By way of contrast, in the instant case, operations pressures of less than 2 or 3 milli-torr are required in electrostatic accelerator columns, wherein here, ranges of between several to tens of milli-torr may be employed, which eliminates the need for specialty high vacuum pumps.

In summary, a new approach is provided herein for neutron/gamma generator design. The electrostatic accelerator column is completely eliminated. The generator has only two components: a plasma source and a target electrode. The generator is more efficient for ion beam formation and is much reduced in size. It can be operated at higher pressures and is therefore ideal for sealed-tube operation. This new generator design cut down on cost and can be used to provide D-D, D-T, T-T neutrons or the p+B$^{11}$ gammas.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An apparatus comprising:
   a chamber;
   a target positioned within the chamber comprising a material configured to generate neutrons or gamma rays when struck by ions;
   a gas source in fluid communication with the chamber configured to deliver a gas to the chamber;

an RF antenna configured to cause a plasma to be generated at a source location in the chamber from the gas;

a plurality of magnets proximate the target, the plurality of magnets configured to direct secondary electrons generated when the ions strike the target back to the target, thereby suppressing the secondary electrons from backstreaming to the source location; and a high voltage source in communication with the target.

2. The apparatus of claim 1, wherein the RF antenna is positioned within the chamber.

3. The apparatus of claim 1, wherein the RF antenna is positioned outside the chamber.

4. The apparatus of claim 1, wherein the plurality of magnets proximate the target comprise permanent magnets.

5. The apparatus of claim 1, wherein the chamber is cylindrical, having a first end and a second end, and wherein the target is positioned adjacent the second end.

6. The apparatus of claim 1, wherein the plurality of magnets comprise a pair of permanent magnets.

7. The apparatus of claim 1, wherein the material is selected from a group comprising titanium, $LaB_6$, $B_4C$, and boron.

8. The apparatus of claim 1, wherein the high voltage source is configured to apply high voltage pulses to the target, and wherein the applied high voltage pulses have a voltage that is lower than a potential of the plasma generated by the RF antenna.

9. The apparatus of claim 1, wherein the high voltage source is configured to apply high voltage pulses to the target to accelerate the ions in the plasma across a boundary of a plasma sheath and towards the target.

10. The apparatus of claim 1, wherein the high voltage source is configured to apply around a negative 100 KV voltage to the target.

11. The apparatus of claim 1, wherein the high voltage source is configured to be pulsed at a rate of tens of Hertz to thousands of Hertz.

12. The apparatus of claim 1, wherein the ions are selected from a group consisting of hydrogen ions, deuterium ions, and tritium ions.

13. A neutron generating apparatus, comprising:
a plasma chamber comprising:
a target positioned within the plasma chamber, the target comprises a material that is configured to generate neutrons or gamma rays when struck by positively charged ions; and
a plurality of magnets that surround the target, the plurality of magnets configured to reflect secondary electrons, generated when the positively charged ions impact the target, back to the target;
a voltage source in communication with the target; and
a gas source in fluid communication with the plasma chamber, the gas source configured to deliver gas that comprises at least one of hydrogen, deuterium, or tritium to the plasma chamber.

14. The neutron generating apparatus of claim 13, the positively charged ions being at least one of $H^+$, $D^+$, or $T^+$.

15. The neutron generating apparatus of claim 13, the voltage source is configured to apply voltages between −100 kV and −165 kV to the target, and wherein when the voltage source applies the voltages to the target, a sheath is formed between the gas source and the target, the sheath acting as an acceleration gap for the protons.

16. The neutron generating apparatus of claim 15 being free of an acceleration column.

17. The neutron generating apparatus of claim 13, further comprising a second plurality of magnets positioned external to the chamber, the second plurality of magnets configured to confine plasma in the chamber when the voltage source does not apply voltage to the target.

18. The neutron generating apparatus of claim 13, further comprising an RF antenna, wherein the RF antenna, when activated, is configured to transform the gas to an ionic plasma.

19. The system of claim 13, the plurality of magnets further configured to capture the secondary electrons at the target.

20. A method comprising:
introducing a source gas into a chamber, the source gas comprising at least one of hydrogen, deuterium, or tritium;
activating a radio frequency (RF) antenna to cause the source gas to be transformed to an ionic plasma;
applying a negative voltage to a target subsequent to the source gas being transformed to the ionic plasma, the applying of the negative voltage to the target causes protons in the ionic plasma to be accelerated to the target and impact the target, and wherein secondary electrons are generated when the protons impact the target; and
reflecting the secondary electrons back to the target, wherein a plurality of magnets are positioned to surround the target, the plurality of magnets configured to perform the reflecting.

* * * * *